United States Patent [19]

Muller

[11] 4,181,867
[45] Jan. 1, 1980

[54] BRUSHLESS DIRECT-CURRENT MOTOR

[75] Inventor: Rolf Muller, St. Georgen, Fed. Rep. of Germany

[73] Assignee: Papst-Motoren KG, St. Georgen, Fed. Rep. of Germany

[21] Appl. No.: 910,005

[22] Filed: May 26, 1978

Related U.S. Application Data

[63] Continuation of Ser. No. 706,550, Jul. 21, 1976, abandoned.

[30] Foreign Application Priority Data

Jul. 21, 1975 [DE] Fed. Rep. of Germany ....... 2532551
Aug. 8, 1975 [DE] Fed. Rep. of Germany ....... 2535411

[51] Int. Cl.² .......................................... H02K 21/12
[52] U.S. Cl. ..................................... 310/156; 310/46;
310/68 R; 310/90; 310/268
[58] Field of Search ................... 310/268, 75 R, 68 R,
310/68 B, 68 D, 67, 90, 40 MM, 156, 191, 190,
46, 49, 48; 318/138, 254

[56] References Cited

U.S. PATENT DOCUMENTS

| 3,840,761 | 10/1974 | Muller | 310/49 R |
|---|---|---|---|
| 3,845,339 | 10/1974 | Merkle | 310/156 |
| 4,007,390 | 2/1977 | Muller | 310/90 |
| 4,011,475 | 3/1977 | Schmider | 310/68 R |
| 4,125,792 | 11/1978 | Schmider | 310/268 |

Primary Examiner—R. Skudy
Attorney, Agent, or Firm—Michael J. Striker

[57] ABSTRACT

An external-rotor brushless direct-current motor has a pair of rotor plates spaced axially apart and connected together for joint rotation about an upright axis. One of these plates carries an annular multipolar axially polarized magnet. A fixed stator plate extends between the two rotor plates and carries a plurality of angularly equispaced sequentially activatable windings. In addition a flux-return element of soft iron is carried on this stator plate and has an outer periphery formed with projections extending into the flux region of the magnet. These projections may simply be the corners or points of a polygonal flux-conducting element, or may be formed between recesses cut into the periphery of this element.

19 Claims, 21 Drawing Figures

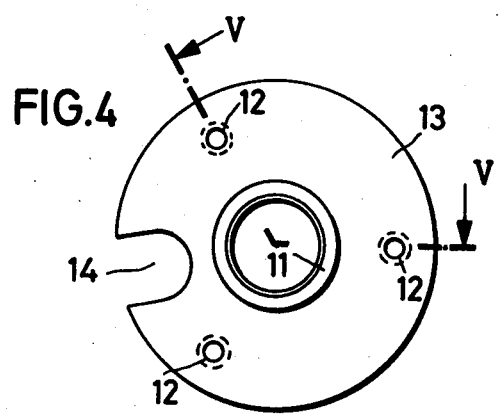
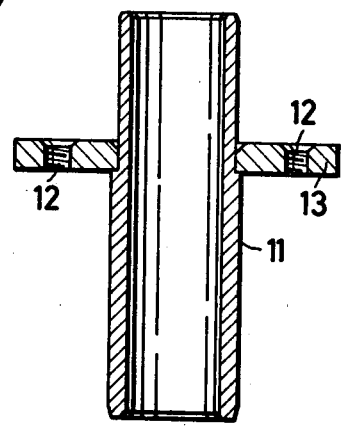
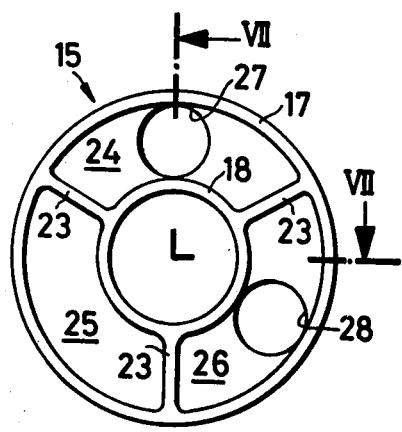
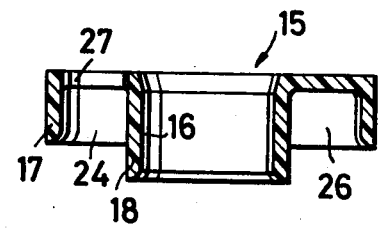

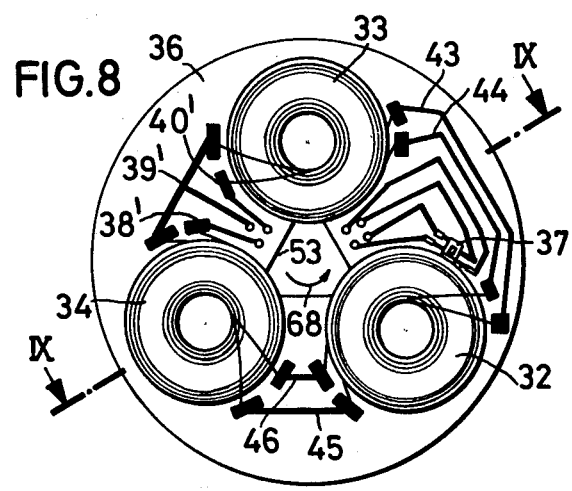
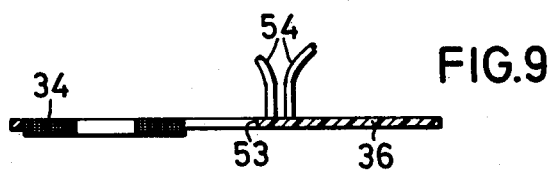
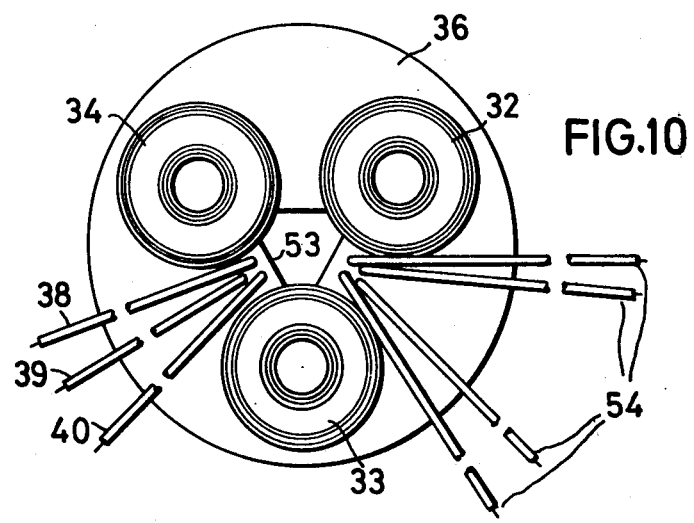

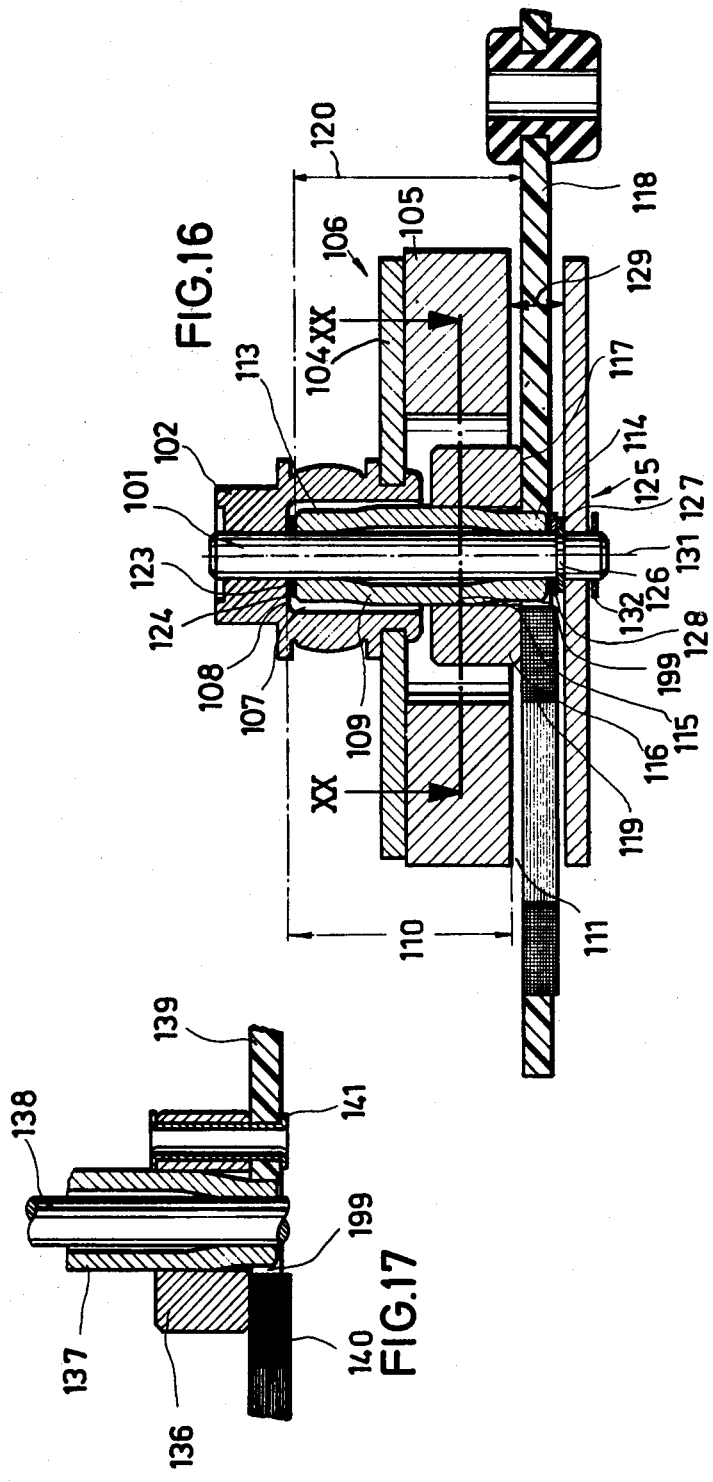

BRUSHLESS DIRECT-CURRENT MOTOR

This is a continuation of application Ser. No. 706,550, filed July 21, 1976, now abandoned.

CROSS-REFERENCE TO RELATED APPLICATIONS

This application is related to commonly assigned patent applications Ser. Nos. 285,520, now U.S. Pat. No. 3,845,339; 363,291, now U.S. Pat. No. 3,840,761; 451,869 now U.S. Pat. No. 3,932,793; 481,563 now U.S. Pat. No. 4,011,475 and 492,146 now U.S. Pat. No. 4,007,390.

BACKGROUND OF THE INVENTION

The present invention relates to a brushless direct-current motor. More particularly this invention concerns such a motor wherein the energized coils are secured to a fixed stator plate and the rotor carries a multipolar permanent magnet that coacts with these coils.

As described in the above-cited patents and patent applications, all of whose disclosures are herewith incorporated by reference, a brushless direct-current motor is known wherein the rotor basically comprises a pair of soft iron or otherwise ferromagnetic plates that are spaced axially apart. A multipolar and axially polarized permanent magnet is mounted on at least one of these rotor plates. A flat normally dielectric support plate is provided between these plates and carries a plurality of angularly spaced coils which are electrically energized sequentially so as rotationally to drive the rotor constituted by the two rotor plates and the permanent magnet. Due to the precision with which the motor speed can be controlled and its small size, such a motor has particular application to tape recorders, record players and the like.

In such motors there is typically provided a flux-conducting element which effectively stores up magnetic energy that can be released in the intervals between the instants when the coils themselves are energized by the driving circuitry of the motor. Such motors are relatively complex in their construction in order to minimize waste of power and allow their overall size to be reduced as much as possible.

SUMMARY OF THE INVENTION

It is therefore an object of the present invention to provide an improved brushless direct-current motor.

Another object is to provide such a motor which is more efficient than the hitherto known such motors.

Yet another object is the provision of an improved motor of the above-described general type which is easier to assemble and has a longer service life than the prior-art motors.

These objects are achieved in accordance with the present invention in a motor having a flat air space between the coils and the permanent magnet and wherein the soft-iron ferromagnetic flux-conducting element is provided inside the permanent-magnet rotor and has an edge formed point-symmetrical to the rotation axis and having a plurality of angularly equispaced projections which extend into the flux region of the rotor magnets. Furthermore the soft-iron flux-conducting element is constituted as a holder for securing the flat drive spools on the stator support.

According to another feature of this invention the axially polarized multipolar magnet carried on one of the rotor plates has the same number of poles as there are projections on the edge of the flux-conducting element. This edge is formed between the projections with recesses so that the flux-conducting element, which is formable of soft iron, resembles a gear wheel centered on the axis. The magnet is annular and centered on the rotation axis of the motor.

According to yet another feature of this invention a plurality of sequentially energizable coils are carried on the stator support between the rotor plates. These coils are sandwiched between the support and the element. To this end according to further features of this invention the motor comprises a stator tube centered on the axis of the motor and secured to the support plate. The annular multipolar magnet surrounds this tube and the element is carried on the tube inside the magnet, the support for the coils being secured to the element and therethrough to the tube.

According to further features of this invention the element and the tube are unitary. They may be formed by machining from a single prismatic workpiece. Alternately they may be formed of sintered material. In the latter case the tube may advantageously have ends constituting bearings for the rotor plates.

According to yet another feature of this invention there is provided between the support and the element a spacer secured to the tube. The coils are sandwiched between the spacer and the element. To this end the support may be a partially conductive plate, preferably a printed-circuit board, and the spacer is of dielectric synthetic-resin material. The support therefore has an outer edge which may be held non-rotatably on the machine in which the motor is to be used. This outer edge will extend radially outwardly between the rotor plates for an extremely compact construction shape of the motor.

According to yet another feature of this invention the tube is formed with a flange and the spacer is carried on this flange. The flange is formed with a cutout accommodating conductors which connect the coils with electronic circuitry serving to sequentially energize these coils. Such circuitry is described in detail in above-cited U.S. Pat. No. 3,932,793. Such circuitry does not continuously energize the coils, the gaps between energization being compensated for as described in above-cited U.S. Pat. No. 3,840,761 by the ferromagnetic element which is effective during the gaps of generating driving torque.

One of the rotor plates according to a further feature of the invention is cup-shaped and has an open end in which the other of the plates is received. The annular magnet and the stator are received between the almost completely closed housing constituted by these plates. The other plate which is not cup-shaped is provided with a central hole accommodating the tube and the spacer. A shaft or axle which defines the rotation axis of the motor carries the two plates and is mounted via bearings on the tube. Means is provided for axially displacing this shaft in order to adjust the flat axial air gap between the rotor plates and the energizing or driving coils.

The motor according to the present invention is extremely flat yet can develop considerable torque due to the careful manner in which the flux is conducted and the field is confined. Furthermore such a motor can be produced at relatively low cost and has a very long service life.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a top view of the stator support tube used in the first embodiment of this invention;

FIG. 5 is a section taken along line V—V of FIG. 4;

FIG. 6 is a view from below of the spacer used in the first embodiment of this invention;

FIG. 7 is a section taken along line VII—VII of FIG. 6;

FIG. 8 is a bottom view of the printed-circuit support plate of the first embodiment of this invention;

FIG. 9 is a section taken along line IX—IX of FIG. 8;

FIG. 10 is a top view of the plate shown in FIG. 8;

FIG. 16 is an axial section through a second embodiment of the motor according to this invention;

FIG. 17 is an axial section through a detail of a third embodiment of the motor according to this invention;

DESCRIPTION OF THE PREFERRED EMBODIMENTS

Figure 1:
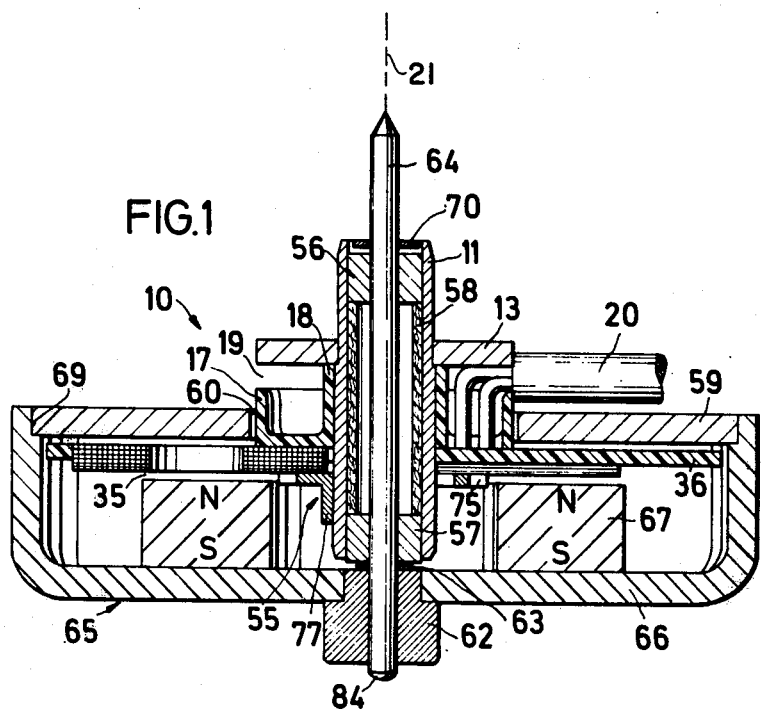
FIG. 1 is an axial section through a first embodiment of the motor according to this invention.
Figure 13:
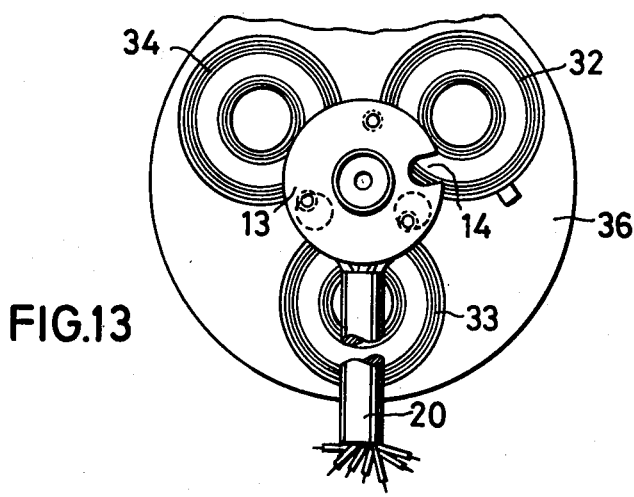
FIG. 13 is a top view of the plate of FIG. 8 with the support tube in place.
Figure 14:
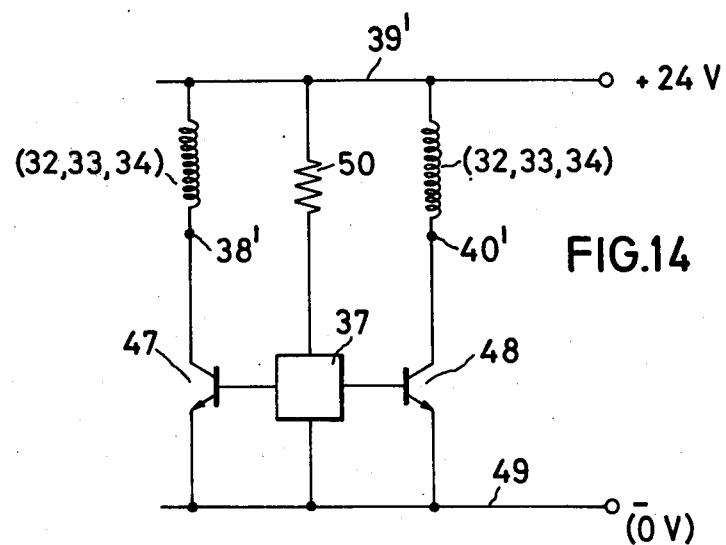
FIG. 14 is a schematic diagram of the circuit used for energizing the first embodiment of the motor according to this invention.

The first embodiment of this invention as shown in FIGS. 1-15 and more specifically shown in FIG. 1 basically comprises a motor 10 having a stator constituted by a stationary mounting tube 11 carrying a transverse plate 36 on which are mounted three flat coils 32, 33 and 34 energized via circuitry shown in FIG. 14. A rotor 65 has a central shaft 64 defining an axis 21 on which most of the parts of the motor are centered. This rotor 65 comprises a cup-shaped plate 66 and, axially spaced therefrom, another plate 59. An annular six-pole axially polarized magnet 67 centered on the axis 21 is carried on the plate 66. FIGS. 1-7 show the parts generally in a 2:1 scale and FIGS. 8-13 in approximately a 1:1 scale.

As better shown in FIGS. 4 and 5 the stator bearing tube 11 which is centered on the axis 21 is metallic and is welded to a transverse washer-shaped flange 13 formed with three angularly equispaced holes 12 facilitating mounting of the support tube 11, and with a radially outwardly open cutout or notch 14 whose function is described below.

A dielectric synthetic-resin spacer 15 shown in detail in FIGS. 6 and 7 has a central hole 16 in which is snugly received the tube 11. This spacer 15 has a cylindrical inner wall 18 which is braced at its upper end on the flange 13 and at its lower end on the plate 36 and a shorter coaxial outer wall 17 forming a gap 19 with the flange 13. Webs 23 interconnect the walls 17 and 18 and define three sectors 24, 25 and 26. The sectors 24 and 26 are formed with respective throughgoing holes 27 and 28 through which pass conductors of a feed cable 20 which is also accommodated in the notch 14 shown in FIG. 4. The holes 27 and 28 are spaced apart by 122.5° relative to the axis 21 and each have a diameter of approximately 6 mm.

Figures 2, 3:
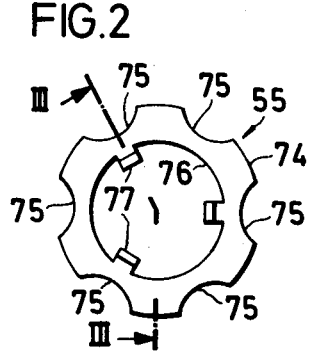
FIG. 2 is a top view of the flux-conducting holding element usable in the first embodiment of this invention.
FIG. 3 is a section taken along line III—III of FIG. 2.
Figure 11:
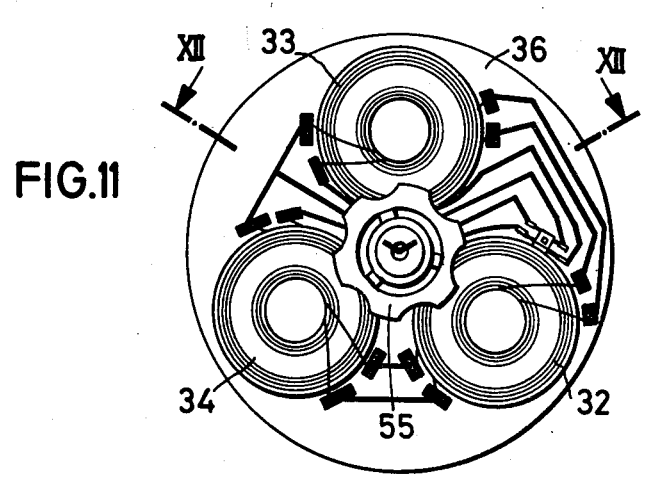
FIG. 11 is a bottom view showing the positioning of the flux-conducting element on the plate of FIG. 8.

FIGS. 2 and 3 show a flow-conducting element 55 which also serves to hold the coils 32-34 against the bottom of the spacer 15. This flux-conducting element 55 is formed by stamping of soft iron and is of generally annular shape with an inner periphery 76 from which extend axial tabs 77 approximately 2 mm wide. Furthermore this element 55 has an outer periphery of a diameter of approximately 22 mm and formed with alternating projections 74 and recesses 75. Six such angularly equispaced projections 74 are provided and the recesses 75 have a radius of curvature of approximately 4.0 mm. This element as shown in FIG. 1 is press-fitted over the lower end of the tube 11 with the tabs 77 extending downwardly away from the spacer 15 and with the corners of three of the recesses 74 radially aligned between the centers of respective coils 32-34 in the axis 21 as best shown in FIG. 11. The peripheral outline of element 55 is point symmetric with respect to the rotation axis of the rotor; i.e., each point on the periphery of element 55 is radially spaced from the rotor rotation axis the same distance as the diametrically opposite point on the periphery.

As best shown in FIGS. 8-10 the coils 32-34 are angularly equispaced about the axis 21 and are radially equispaced at their centers from this axis 21. These coils 32-34 are received in corresponding shaped throughgoing holes formed in a printed-circuit disc constituting the plate 36. The coils 32-34 are each of the double-conductor type and are wound from their inside out in a counterclockwise direction. The plate 36 also carries, relative to its normal direction of rotation indicated by arrow 68 in FIG. 8 a Hall generator 37 that is immediately ahead of the coil 32. Each of these coils 32-34 is formed of varnished or enameled wire adhered together to form a unitary compact assembly and is of flat cylindrical shape. These coils 32-34 are spaced via a gap 35 from the planar upper surface of the six-pole magnet 67 carried on the plate 66.

The coils are supplied with direct-current voltage via conductors 38, 39 and 40 which are connected to respective printed-circuit conductors 38', 39' and 40' on the bottom face of the plate 36. Two wires go counterclockwise from the conductors 39' and 40' into the center of the coil 33, and the opposite two ends of these wires are connected via printed-circuit conductors 43 and 44 to two similar wires going counterclockwise to the interior of the coil 32 in back of the coil 33 relative to the direction 68. The outer ends of the wires of the coil 32 are connected via printed-circuit conductors 45 and 46 to wires going to the inner periphery of the coil 34 and the opposite ends of these wires are connected to the conductors 38' and 39'.

As shown in FIG. 14 the coils 32-34 each have two windings, one connected in series with one of the windings of each of the other coils and the other connected in series with each of the other windings of the other coils. The coils 32-34 are all connected on one side to a positive common line connected to 39'. The conductor 38' is connected to the collector of a NPN transistor 47 and the conductor 40' is connected similarly to the collector of a transistor 48. Both of these transistors 47 and 48 have their emitters connected to the zero-voltage line 49 and their bases connected to the Hall generator 37 which is connected via conductors 54 to the line 49 and through a resistor 50 to the line 39'. For more details about the functioning of this drive circuit see the above-cited U.S. Pat. No. 3,932,793.

During operation of the motor the output voltage of the Hall generator 37, which corresponds to the field of the rotor 65, causes clockwise and counterclockwise generation of pulses through the coils 32-34, with gaps between energization of these coils as described in the above-cited application Ser. No. 481,563, now U.S. Pat. No. 4,011,475.

At its center the plate 36 has a triangular throughgoing hole 53 that fits around the tube 11 when the assembly is mounted together. The wires 38-40 are lead through the hole 28 in the spacer 15 and the wires 54 through the hole 27 of the spacer 15. Then they are connected together by means of a common shielding as shown at 20 to form the major power cable for the motor 10.

Figure 12:
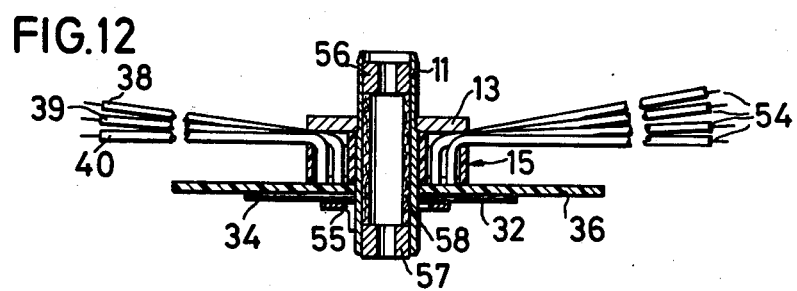
FIG. 12 is a section taken along line XII—XII of FIG. 11.

After the tube 11, spacer 15 and support plate 36 have been assembled as shown in FIGS. 11-13, with a thin insulating disc 52 provided underneath the coils 32-34 and on top of the flux-conducting element 55, the entire assembly is connected and adhered together by means of epoxy resin so that it becomes very tough and rigid. Then two sintered bearings 56 and 57 are fitted into the ends of the tube 11, spaced apart by means of an oil-storage or holding sleeve 58.

The thus epoxied assembly is then inserted up through the hole 60 in the plate 59 until this plate 59 rests directly on the upper surface of the plate 36. A spacer ring 63 is then fit over the shaft 64 and the cup-shaped plate 66 carrying the magnet 67 is fitted up underneath the plate 59 so that this plate 59 rests on a shoulder 69 formed at the open upper edge of the cup-shaped plate 66. A sleeve 62 carried on the shaft 64 supports the plate 66 as shown. The spacer 63 serves to establish the spacing 35. Thereafter a washer 70 is press-fitted down over the top of the axle 64 and will, as described below, serve as an axial bearing. This washer 70 also holds the motor together prior to installation. The magnet 67 is described in detail in above-cited patent application Ser. No. 481,563, now U.S. Pat. No. 4,011,475 and is shown in detail in FIG. 4 of U.S. Pat. No. 3,840,761.

The element 55 serves when the motor operates to create the necessary reluctance moment for the motor. This is done in conjunction with the field at the inner periphery of the magnet 67 so as to create a reluctance moment which is counterphased to the changing portion of the electromagnetic drive moment and which therefore compensates for this changing component so that there is imparted to the shaft 64 a moment which at the nominal moment of the motor is substantially free of deviations, that is alternating-current components.

Figure 15:
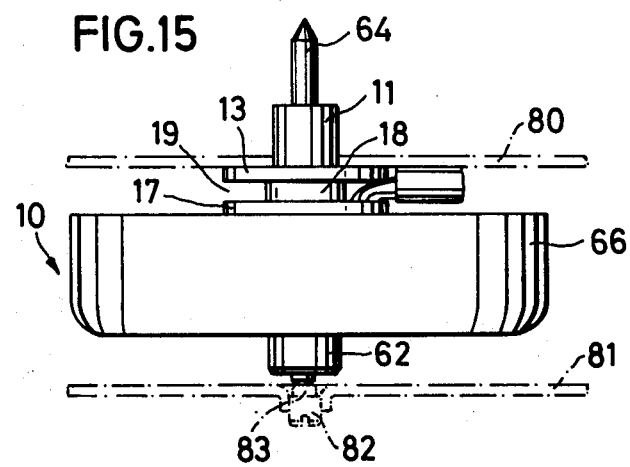
FIG. 15 is a side view illustrating installation of the first embodiment of the motor according to this invention.

As shown in FIG. 15 it is then possible to secure the motor between a pair of mounting plates 80 and 81. Screws through the holes 13 are engaged in the plate 80 so that the motor is, therefore, hung from the tube 11. The rounded lower end 84 (see FIG. 1) of the shaft 64 bears on the upper end 83 of a set screw 82 screwed into the plate 81. This set screw 82 is rotated to establish the desired spacing 35 and is then fixed in place by means of lacquer or the like.

The element 55 can lie against the spools 32 and 34 directly if desired. This is desirable in many situations because then the magnetically active edge 74 and 75 of this member can be closer to the magnet 67 so that the reluctance moment is maximized. It is noted that with this assembly no flywheel is necessary because the considerable mass of the external rotor serves this function.

FIG. 16 shows another motor in accordance with this invention having a shaft 101 rotatable about a vertical axis 131 and carrying a hub 102 on which is mounted via a groove 103 a rotor 106 constituted by a first or upper rotor plate 104 and an axially polarized 4-pole permanent magnet 105. The rotor 106 is further formed of a second plate 125 carried on the lower end of the shaft 101 and secured to a snap ring 127 received in a groove 126 formed on this shaft 101. In addition a ring 132 secures this element 125 in place.

The stator of this assembly comprises a synthetic-resin plate 118 securable to a support via grommets 130 at its outer edge extending radially beyond the rotor 106. In addition two coils 119 are mounted in this plate 118 angularly equispaced about the axis 131. Only one coil is shown in FIG. 16 which is a section taken along a pair of non-aligned radii.

Figure 20:
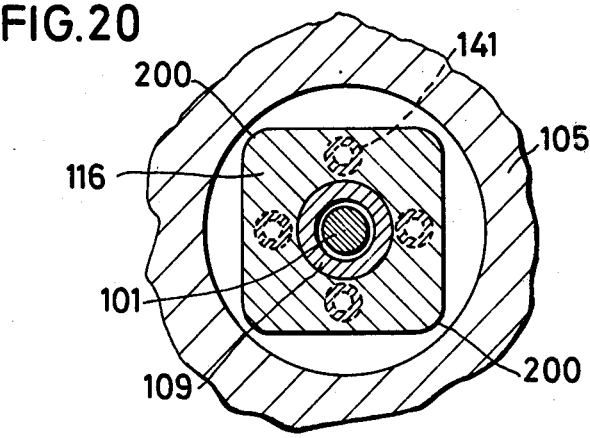
FIG. 20 is a cross-section through the third embodiment of FIG. 17, taken generally along line XX—XX of FIG. 16.

A flux-conducting member 116 has its lower surface 117 glued to the plate 118 and is of generally square shape as shown in FIG. 20. This element 116 is press-fitted over the lower center portion 115 of a tube 109 having a smaller-diameter upper end 113 and a smaller-diameter lower end 114 constituting bearings. The coil 119 is separated via a spacing 199 from the end 114 which rests via a bearing-washer 128 of steel on the snap ring 127. Similarly the sintered upper end 113 engages via a pair of washers 123 and 124 against the shoulder 108 formed in the stepped bore 107 in the hub 102.

The washers 123, 124 and 128 establish the distance 110 between the lower surface 112 of the magnet 105 and the shoulder 108. In addition the spacing 111 between this lower surface 112 and the top of the coil 119 as well as the distance 111' between the bottom of the coil 119 and the top of the plate 125, as well as the spacing 129 between the bottom 112 and the top of the plate 125 is established by these washers. Furthermore these washers establish the spacing 120 between the top of the sleeve 109 and the top of the support plage 118.

The hub 102 is formed with a surface 196 over which a belt may be tensioned for receiving the motor output.

The disc 115 has a relatively large axial length. This gives a good press-fit on the portion 115 of the tube 109. Thus it is possible to reduce the overall height of the assembly. The amount of the additional reluctance moment is established by the thickness of this element.

It is possible as shown in FIGS. 17 and 20 to secure an element 136 identical to the element 116 to a tube 137 and via hollow rivets 141 to a plate 139. A shaft or axle 138 passes through this assembly and a space 199 is left between the lower end of the tube 137 and a coil 140 carried in the plate 139. These rivets 141 are shown in FIG. 20, although otherwise the reference numerals of FIG. 16 are applied in FIG. 20 to structure that is identical. This Figure shows, it is noted, the projections 200 constituted by the corners of the element 116.

Figure 18:
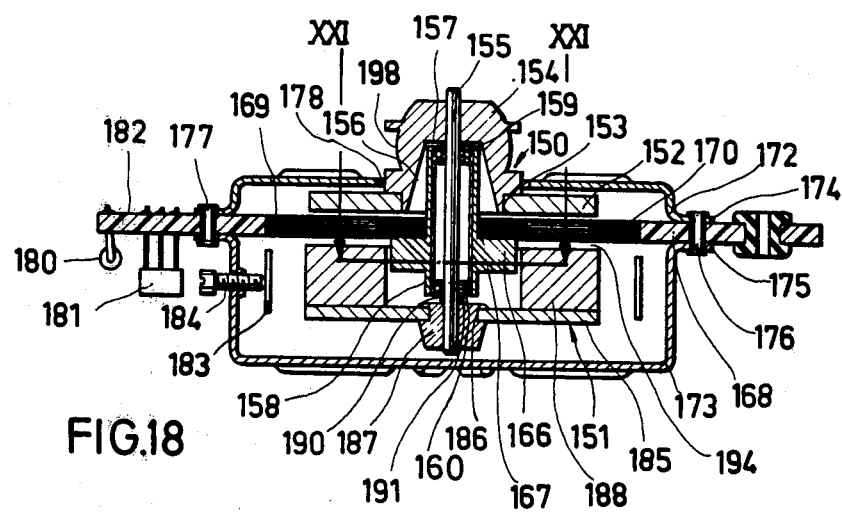
FIG. 18 is an axial section through a fourth embodiment of the motor in accordance with the present invention.
Figure 19:
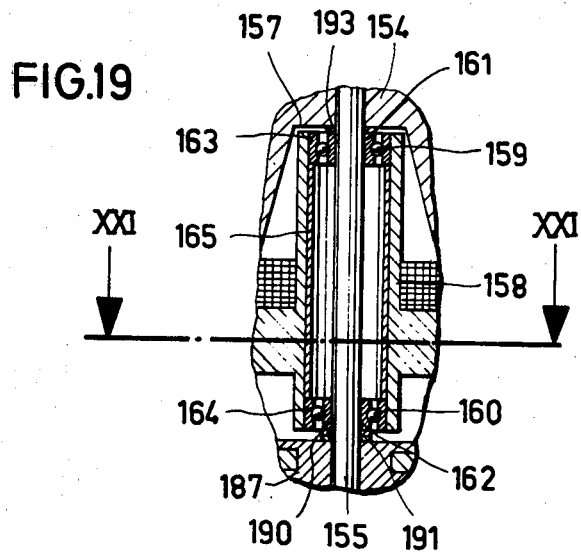
FIG. 19 is a large-scale view of a detail of FIG. 18.
Figure 21:
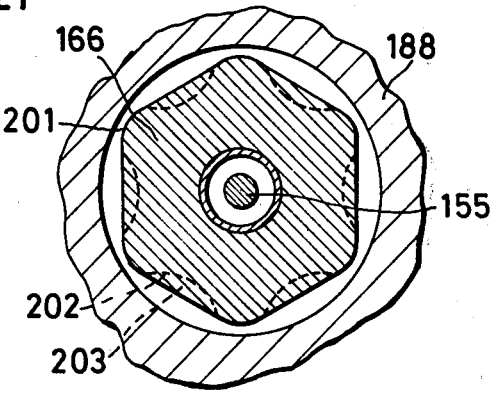
FIG. 21 is a section taken along line XXI—XXI of FIG. 18.

FIGS. 18, 19 and 21 show a fourth embodiment of the motor according to this invention. This motor comprises a rotor 150 formed of a lower rotor disc 151 carrying a magnet 188 and an upper rotor disc 152 secured to a hub 154. The hub 154 is formed with a stepped bore 156 having a floor 157 and is carried on an axle 155 whose lower end has another hub 187 having a peripheral groove 186 in which is received the inner periphery of the lower disc 151. A stator sleeve 158 centered on the axis of the shaft 155 carries an upper roller bearing 159 and the lower roller bearing 160. The inner races 161 and 162 of these bearings 159 and 160 are carried on the shaft 155 and the outer races 163 and 164 are carried inside the tube 158 and are separated by a sleeve 165. A flux-return disc 166 of hexagonal shape as shown in FIG. 21 is formed unitarily with the sleeve 158 and has corner projections 201 and may be formed between these projections 201 with recesses 203 having curved surfaces 202.

A spacer washer 193 is received between the inner race 161 of the bearing 159 and the upper ceiling 157 of the bore 156. Similarly a pair of discs 190 and 191 are received between the inner race 162 and the upper surface of the lower hub 187.

The stator is formed by a synthetic-resin plate 168 provided with coils 169 and 170 and lying on the upper surface 167 of the flux-return member 166 and glued thereto. This plate 168 has an outer edge 182 carrying circuit elements 180 and 181 and engaged between outer edges 174 and 175 of housing flux-containing members 172 and 173 which are secured to this plate 168 via rivets 176 and 177. A central aperture 178 is provided in the upper downwardly open cup-shaped member 172 for receiving the hub 154. These elements 172 and 173 are made of soft iron.

In addition a ring 183 also of soft iron is mounted via means not shown inside the lower upwardly open cup-shaped half 173 and can be displaced therein via a screw 184 for adjusting the magnetic characteristics of the assembly. The spacing 194 between the magnet 188 and the lower surface of the stator is determined by the thickness of the washers 190, 191 and 193. Once again the hub 154 has a surface 198 allowing a belt to be spanned over it.

The sintered unitary element 158, 166 is particularly advantageous. Furthermore if less than a 6 mm shaft diameter is being used it is possible to do away with the bearings 159 and 160 for an extremely inexpensive construction of the motor.

It will be understood that each of the elements described above, or two or more together, may also find a useful application in other types of constructions differing from the types described above.

While the invention has been illustrated and described as embodied in a brushless direct-current motor, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features, that from the standpoint of prior art, fairly constitute essential characteristics of the generic or specific aspects of this invention.

What is claimed as new and desired to be protected by Letters Patent is set forth in the appended claims.

1. A brushless direct-current motor comprising: a pair of ferromagnetic rotor plates jointly rotatable about and spaced apart along an axis; at least one axially polarized permanent magnet carried on one of said plates and orbitable about said axis on rotation of said plates; a stator bearing tube extending in the direction of said axis and located radially inward of said axially polarized permanent magnet; a non-magnetic flat stator support between said rotor plates; an electrically energizable coil fixed to said stator support between said plates offset from said axis and spaced axially by a flat air gap from said magnet; and a ferromagnetic flux-conducting reluctance-torque-generating element mounting the flat stator support on the stator bearing tube, the ferromagnetic flux-conducting element being located radially inward of the axially polarized permanent magnet, the ferromagnetic flux-conducting element comprising a plurality of equiangularly spaced projections cooperating with the magnetic field of the part of said magnet nearest to said axis to generate a reluctance torque, the peripheral outline of said flux-conducting element being point symmetric with respect to said axis.

2. The motor defined in claim 1, wherein said magnet has a number of poles corresponding to the number of projections on said element.

3. The motor defined in claim 1, wherein said element is formed with recesses between said projections.

4. The motor defined in claim 1, wherein said magnet is annular, centered on said axis, and multipolar.

5. The motor defined in claim 1, wherein a plurality of such coils are angularly spaced on said support.

6. The motor defined in claim 5, said magnet being annular and surrounding said bearing tube.

7. The motor defined in claim 6, wherein said element and said tube are unitary.

8. The motor defined in claim 7, wherein said unitary element and tube are constituted by sintered material and said tube has ends constituting bearings for said rotor plates.

9. The motor defined in claim 5, further comprising a spacer between said support and said element and secured to said tube, a plurality of such coils being arranged between said spacer and said element.

10. The motor defined in claim 9, wherein said support comprises a printed-circuit plate and said spacer is dielectric.

11. The motor defined in claim 9, wherein said support has an outer edge adapted to be held non-rotatable.

12. The motor defined in claim 9, wherein said element is a soft-iron annular plate having a number of said projections corresponding to the number of poles of said magnet.

13. The motor defined in claim 12, wherein said element is press-fitted on said tube.

14. The motor defined in claim 9, wherein said tube is formed with a flange, said spacer being carried on said flange.

15. The motor defined in claim 14, further comprising means for sequentially energizing a plurality of such coils angularly spaced about said support and including a plurality of conductors connected to said coils, said flange being formed with a cutout accomodating said conductors.

16. The motor defined in claim 14, wherein one of said rotor plates is cup-shaped and has an open end in which the other of said plates is received, said magnet being annular and between said plates.

17. The motor defined in claim 16, wherein said other plate has a central hole accommodating said tube and said spacer.

18. The motor defined in claim 16, further comprising a shaft defining said axis and carrying said plates, and means for axially displacing said shaft relative to said support.

19. The motor defined in claim 16, wherein said one plate is upwardly cupped.

* * * * *